(12) United States Patent
Kikuchi et al.

(10) Patent No.: US 7,554,591 B2
(45) Date of Patent: Jun. 30, 2009

(54) PHOTOELECTRIC CONVERSION APPARATUS AND IMAGE SENSING SYSTEM USING THE SAME

(75) Inventors: Shin Kikuchi, Isehara (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 12/025,828

(22) Filed: Feb. 5, 2008

(65) Prior Publication Data

US 2008/0211948 A1 Sep. 4, 2008

(30) Foreign Application Priority Data

Mar. 2, 2007 (JP) .............................. 2007-053051

(51) Int. Cl.
H04N 3/14 (2006.01)
H04N 5/335 (2006.01)
H01L 27/00 (2006.01)

(52) U.S. Cl. .................................. 348/308; 250/208.1
(58) Field of Classification Search ................. 348/302, 348/308
See application file for complete search history.

(56) References Cited

U.S. PATENT DOCUMENTS

| | | | | |
|---|---|---|---|---|
| 5,998,779 A | 12/1999 | Kozuka | .................... | 250/208.1 |
| 6,188,094 B1 | 2/2001 | Kochi et al. | .................... | 257/232 |
| 6,291,810 B1* | 9/2001 | Yokomichi et al. | ......... | 250/208.1 |
| 6,377,304 B1* | 4/2002 | Saitoh | ........................ | 348/308 |
| 6,670,990 B1 | 12/2003 | Kochi et al. | .................. | 348/310 |
| 6,750,912 B1* | 6/2004 | Tennant et al. | ............... | 348/308 |
| 6,798,453 B1* | 9/2004 | Kaifu | ........................ | 348/308 |
| 6,803,957 B1* | 10/2004 | Machida et al. | ............. | 348/308 |
| 6,847,026 B2* | 1/2005 | Koizumi et al. | ........... | 250/208.1 |
| 6,847,399 B1* | 1/2005 | Ang | ........................... | 348/308 |
| 6,953,923 B2* | 10/2005 | Yang et al. | ................ | 250/208.1 |
| 6,960,751 B2 | 11/2005 | Hiyama et al. | ............ | 250/208.1 |
| 7,016,089 B2 | 3/2006 | Yoneda et al. | .............. | 358/482 |
| 7,091,467 B2* | 8/2006 | Yokomichi | ............... | 250/208.1 |
| 7,110,030 B1 | 9/2006 | Kochi et al. | .................. | 348/308 |
| 7,227,208 B2 | 6/2007 | Ogura et al. | ................. | 257/292 |
| 7,321,110 B2 | 1/2008 | Okita et al. | .............. | 250/208.1 |
| 7,324,144 B1 | 1/2008 | Koizumi | ..................... | 348/294 |
| 7,352,400 B2* | 4/2008 | Sakurai et al. | .............. | 348/308 |
| 7,471,324 B2* | 12/2008 | Tu et al. | ..................... | 348/308 |
| 2003/0164887 A1 | 9/2003 | Koizumi et al. | ............. | 348/308 |
| 2004/0069930 A1* | 4/2004 | Zarnowski et al. | ........ | 250/208.1 |
| 2004/0119864 A1 | 6/2004 | Kikuchi | ...................... | 348/308 |

(Continued)

FOREIGN PATENT DOCUMENTS

JP 10-191173 A 7/1998

(Continued)

*Primary Examiner*—John M Villecco
(74) *Attorney, Agent, or Firm*—Fitzpatrick, Cella, Harper & Scinto

(57) ABSTRACT

A photoelectric conversion apparatus includes a pixel unit having a plurality of pixels arranged in a matrix, a plurality of block lines to which signals are supplied from the pixels, transfer switches used to supply the signals from the block lines to a common signal line, and a driving circuit configured to drive the pixels, the block lines, and the transfer switches. The block lines have resetting units used to reset potentials of the block lines. With this configuration, a signal reading operation is performed at high speed in the photoelectric conversion apparatus.

8 Claims, 8 Drawing Sheets

U.S. PATENT DOCUMENTS

| | | | |
|---|---|---|---|
| 2004/0159771 A1* | 8/2004 | Yang et al. | 250/208.1 |
| 2005/0128327 A1* | 6/2005 | Bencuya et al. | 348/308 |
| 2005/0264665 A1* | 12/2005 | Endo et al. | 348/308 |
| 2005/0270393 A1* | 12/2005 | Noda et al. | 348/308 |
| 2005/0270395 A1* | 12/2005 | Yoneda et al. | 348/308 |
| 2006/0157759 A1 | 7/2006 | Okita et al. | 257/292 |
| 2006/0158539 A1 | 7/2006 | Koizumi et al. | 348/300 |
| 2006/0158543 A1 | 7/2006 | Ueno et al. | 348/308 |
| 2006/0208291 A1 | 9/2006 | Koizumi et al. | 257/292 |
| 2006/0208292 A1 | 9/2006 | Itano et al. | 257/292 |
| 2006/0221667 A1 | 10/2006 | Ogura et al. | 365/149 |
| 2007/0229687 A1* | 10/2007 | Hiyama et al. | 348/294 |
| 2008/0036891 A1 | 2/2008 | Ono et al. | 348/308 |
| 2008/0062294 A1 | 3/2008 | Koizumi et al. | 348/300 |
| 2008/0062295 A1 | 3/2008 | Fujimura et al. | 348/301 |
| 2008/0062296 A1 | 3/2008 | Ogura et al. | 348/308 |
| 2008/0259178 A1* | 10/2008 | Oike | 348/294 |
| 2008/0309809 A1* | 12/2008 | Cieslinski | 348/308 |

FOREIGN PATENT DOCUMENTS

JP    2003-224776 A    8/2003

* cited by examiner

US 7,554,591 B2

PHOTOELECTRIC CONVERSION APPARATUS AND IMAGE SENSING SYSTEM USING THE SAME

BACKGROUND OF THE INVENTION

1. Field of the Invention

The present invention relates to photoelectric conversion apparatuses, and particularly relates to a read circuit of a photoelectric conversion apparatus.

2. Description of the Related Art

In general, photoelectric conversion apparatuses are used in digital still cameras. For example, photoelectric conversion apparatuses employing CCD sensors or MOS photoelectric conversion apparatuses are typically used. Such a MOS photoelectric conversion apparatus includes a pixel unit including basic cells (pixels) having photoelectric conversion elements such as photodiodes, the basic cells being arranged in a plane, a holding unit that holds signals transmitted from the pixel unit, and a common signal line (horizontal signal line) used to output the signals supplied from the holding unit to an external device.

Improvements have been made to photoelectric conversion apparatuses to increase the number of pixels and to thereby meet a demand for a larger format. Accordingly, the number of switching transistors has increased (that is, total source capacitance has increased) and the capacitance of a signal line has increased, resulting in an increased parasitic capacitance of the common signal line. Japanese Patent Laid-Open No. 2003-224776 discloses a photoelectric conversion apparatus having a configuration in which a signal supplied from a pixel unit is read to block lines and thereafter output to a common signal line so that the capacitance of the common signal line is reduced.

Meanwhile, to address the increased number of pixels, there has been a demand to increase a speed of a signal reading operation. The speed of the signal reading operation is determined in accordance with the capacitance of the common signal line and a speed of a resetting operation of the common signal line. In the resetting operation of the common signal line, before or after a signal is read, a potential of the signal line is set to a predetermined potential. Note that Japanese Patent Laid-Open No. 10-191173 discloses such a technique.

SUMMARY OF THE INVENTION

The present invention provides a photoelectric conversion apparatus that includes block lines and that is capable of performing a resetting operation at high speed.

According to an exemplary embodiment of the present invention, there is provided a photoelectric conversion apparatus including a pixel unit having a plurality of pixels, which have photoelectric conversion elements and which are arranged in a matrix, a plurality of capacitors to which signals are supplied from the pixels, first transfer switches, which transfer signals from the plurality of capacitors, a plurality of signal lines to which the signals are supplied from the plurality of capacitors, second transfer switches, which transfer the signals supplied from the plurality of signal lines, a common signal line to which the signals are supplied from the plurality of signal lines, and a driving circuit. Furthermore, resetting units, which reset potentials of the plurality of signal lines, are connected to the plurality of signal lines.

With this configuration, a signal reading operation may be performed at high speed.

Other features and advantages of the present invention will be apparent from the following description taken in conjunction with the accompanying drawings, in which like reference characters designate the same or similar parts throughout the figures thereof.

Figure 1:
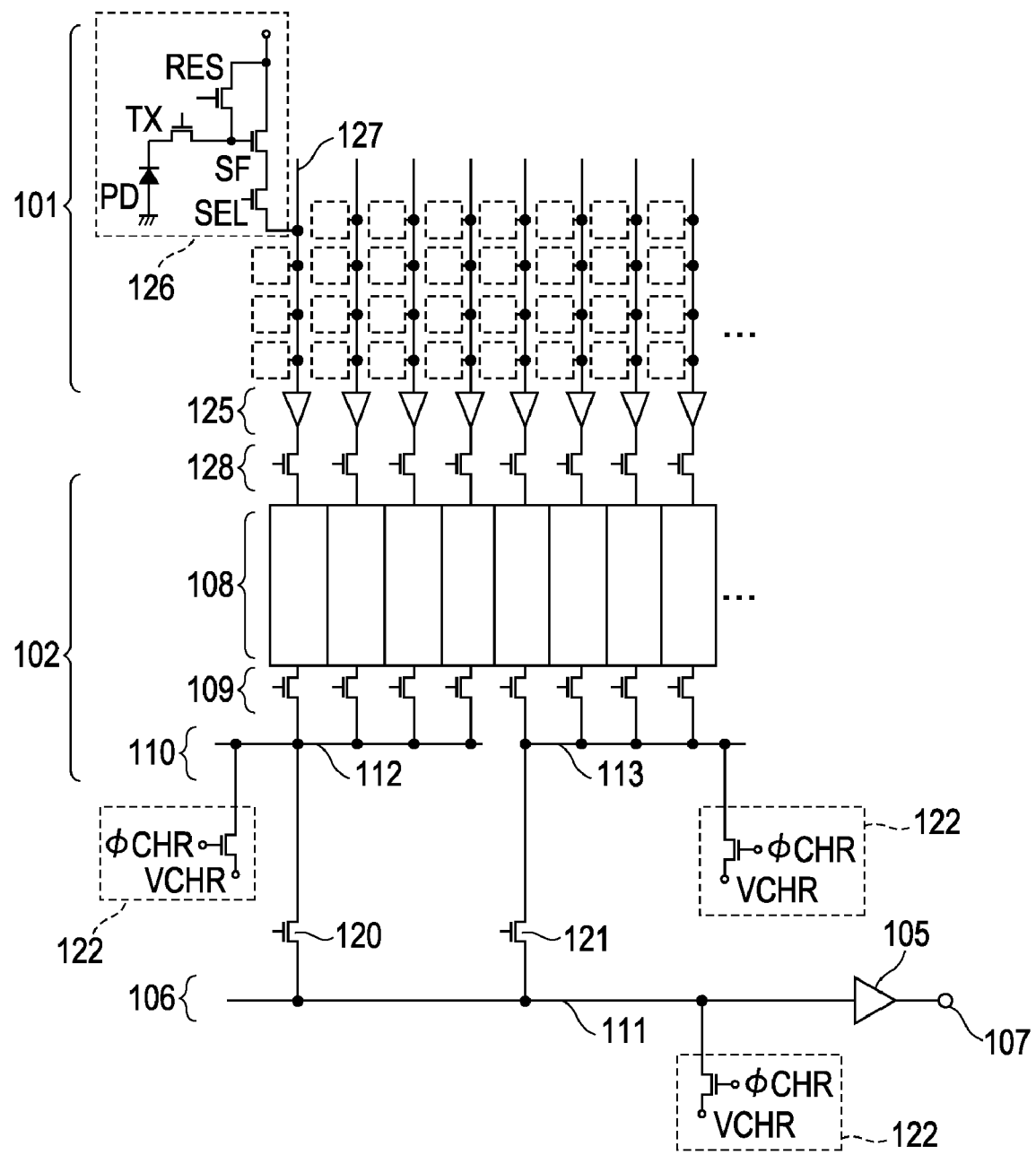
FIG. 1 is a circuit diagram schematically illustrating a read unit according to a first exemplary embodiment.

The accompanying drawings, which are incorporated in and constitute a part of the specification, illustrate exemplary embodiments of the invention and, together with the description, serve to explain the principles of the invention.

DESCRIPTION OF THE EMBODIMENTS

In an exemplary configuration of the present invention, in which a predetermined number of signal holding portions among all signal holding portions that hold signals supplied from a plurality of vertical signal lines are connected to a corresponding identical block line among a plurality of block lines, resetting units are arranged in the plurality of block lines. With this configuration, potentials of the plurality of block lines are readily reset at high speed. Accordingly, an amount of time required for resetting the potentials of the block lines is reduced, and signals output from pixels are read at high speed. Note that the resetting units are used to set the potentials of some lines to a desired potential (resetting potential) VCHR. The resetting units include power supply sources, which supply resetting voltages, and switches, which control supply of the resetting voltages.

Japanese Patent Laid-Open No. 2003-224776 discloses a configuration for performing a resetting operation utilizing a resetting unit connected to a common signal line (horizontal signal line). In this case, potentials of block lines are set to a resetting potential using the common signal line and switches. Accordingly, a capacitance and a resistance generated in a path that supplies resetting voltages become large and, therefore, a speed of a signal reading operation is deteriorated. In this point, the configuration needs more consideration. Furthermore, in a case where an amount of time for performing the resetting operation is insufficient, variations in the potentials are generated in accordance with distance from the resetting unit. In this point also, the configuration needs more consideration.

To address these issues, according to an exemplary configuration of the present invention, resetting units are connected to a plurality of block lines, thus enabling resetting operations to be performed at high speed. That is, the block lines are reset without using a common signal line.

The resetting operation performed on a signal line will be described hereinafter. First, a signal output operation will be described.

When a signal is output to the common signal line from a capacitor serving as the signal holding unit that holds the signal, the signal is output on the basis of a splitting ratio of a capacitance of the signal holding unit to a capacitance of the common signal line. A magnitude of the signal and a speed of the signal output to the common signal line are represented as follows. It is assumed that a capacitance in the capacitor is represented by CT, the signal is represented by Vsig, the capacitance of the common signal line is represented by CH, and the signal output to the common signal line is represented by Vout. Furthermore, it is assumed that a capacitance of a block line is represented by CHB, an on-resistance of a MOSFET output from the block line is represented by R, and a resistance of a resetting unit arranged in the common signal line is represented by RR. Here, the resetting unit is constituted by a switch (for example, a MOSFET used for a resetting operation). Because drains (or sources) of a plurality of MOSFETs are connected to the common signal line in parallel, the capacitance CH of the common signal line is substantially proportional to the number of connected MOSFETs. Here, taking only a capacitance supplied from the capacitor to the common signal line into consideration, Vout=Vsing×CT/(CH+CT) is obtained. A time Tsig required for outputting the signal is obtained using a harmonic average as follows: Tsig=(CT//CH)×R=(CT×CH)×R/(CH+CT). A time TRES required for resetting the common signal line is obtained as follows: TRES=CH×RR. It is assumed that the equation RR=R is satisfied. When the time Tsig is compared with the time TRES, Tsig<TRES is obtained. That is, (an output time constant)<(a resetting time constant) is satisfied and, therefore, it is apparent that a speed of a signal reading operation is influenced by the time required for resetting.

To efficiently perform the resetting operation, the smaller the value of RR, the better the result. Accordingly, for example, MOSFETs having large driving forces may be used. In this case, however, the capacitance is increased as described above, that is, the capacitance CH is increased. Furthermore, because the block lines are provided, a problem of a time constant similarly arises. Here, a case where resetting units are arranged on only the block lines is taken as an example. In this case, because the block lines and a common line capacitor should be simultaneously reset, the driving forces of the MOSFETs of the resetting unit are required to be large. However, a large driving force leads to an increased capacitance, as described above, and therefore a gain of the signal is deteriorated when the capacitance CT is divided to obtain the capacitance CH.

Therefore, it is necessary to take into consideration a balance of a characteristic of signal transmission and a characteristic of the resetting operation, in order to determine the capacitance CH. Accordingly, with the resetting units arranged on the plurality of block lines, driving forces of the MOSFETs are optimized and resetting operations are performed at high speed. Furthermore, the on-resistance (driving force) of a MOSFET used to transmit the signal from the block lines to the common signal line is optimized so that an appropriate value for the signal transmission is obtained. Consequently, the signal transmission and the resetting operations for the block lines and the common signal line can be performed at high speed. Note that although a MOSFET is described hereinabove as an example of a switch, the switch is not limited to a MOSFET. Although a MOSFET will be taken as an example hereinafter, other elements may be used. Furthermore, a "switch" described hereinafter may be replaced by a MOSFET or other general elements.

Figure 6:
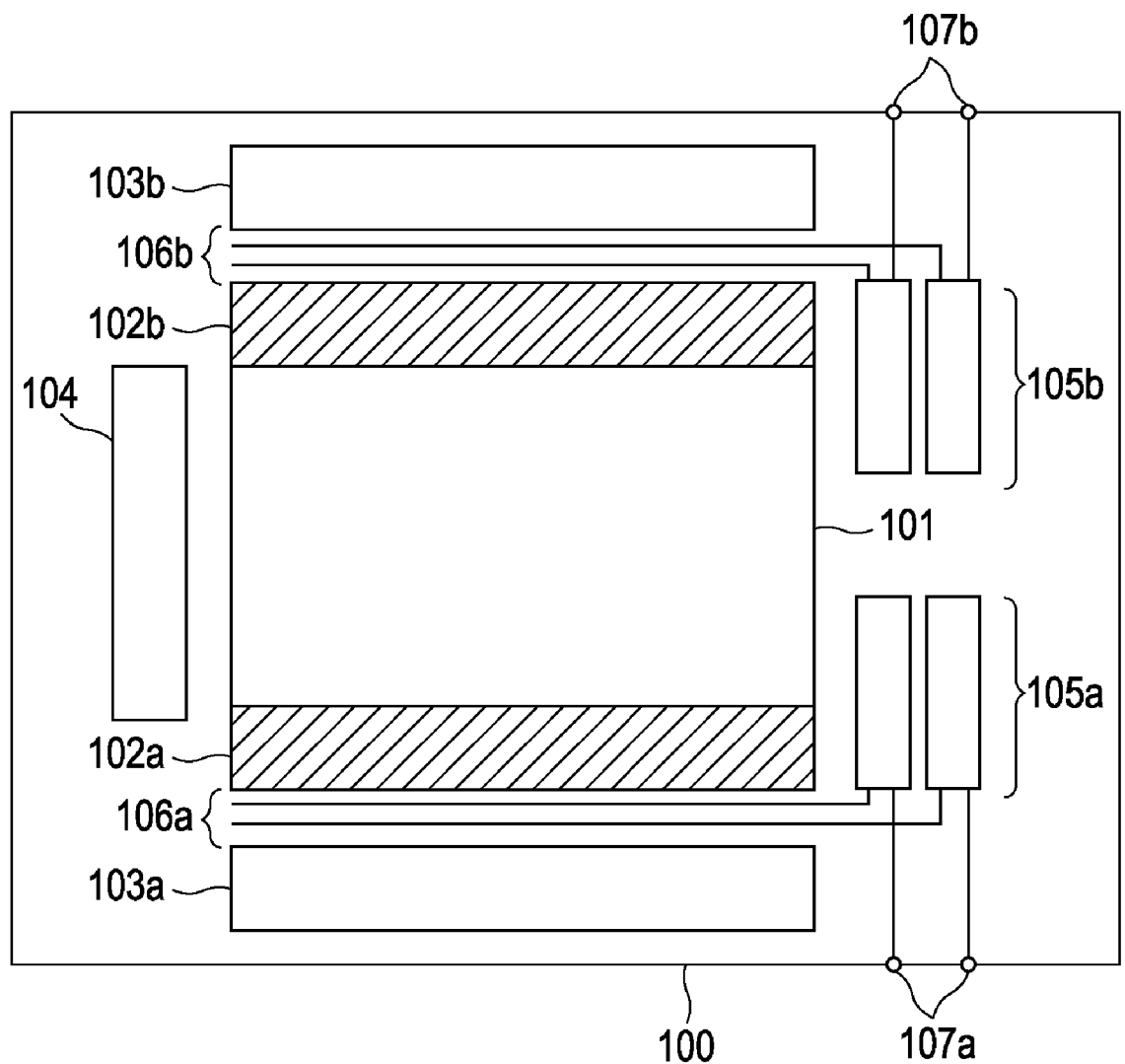
FIG. 6 is a plan view schematically illustrating a photoelectric conversion apparatus according to the second exemplary embodiment.

Referring to FIG. 6, an entire configuration of a photoelectric conversion apparatus will be described. In FIG. 6, a pixel unit 101 includes a plurality of basic cells (pixels) having photoelectric conversion elements (photodiodes, for example). A configuration of a circuit will be described in detail later. A capacitor unit 102 (that is, a read unit 102a and a read unit 102b) includes line memories serving as signal holding units, and has MOSFETs used to output signals to a common signal line. Because the capacitor unit 102 is used to read the signals stored in the line memories using the MOSFETs, the capacitor unit 102 is referred to as a read unit 102 hereinafter. The read unit 102 may include a signal amplifier and an A/D converter. The read unit 102 includes a block line unit 110 (shown in FIG. 1). An aspect of the present invention is characterized in resetting mechanisms connected to the block lines. Specifically, an aspect of the present invention is characterized in that resetting units are provided on the plurality of block lines.

A first driving circuit unit 103 (including a first driving circuit 103a and a first driving circuit 103b) includes a horizontal scanning circuit. Note that, in FIG. 6, reference characters "a" and "b" denote components having the same functions. For example, a signal is arbitrarily supplied from the pixel unit 101 to a first read unit 102a or a second read unit 102b to be read out. A second driving circuit unit 104 (including a vertical scanning circuit), an amplifier circuit 105 (an amplifier circuit 105a and an amplifier circuit 105b), an output terminal 107 (first output terminals 107a and first output terminals 107b), and a common signal line 106 (common signal lines 106a and common signal lines 106b) are provided. The common signal line 106 is denoted by two lines for simplicity in the figure, and a configuration thereof will be described in detail later.

Although a configuration will be described in detail hereinafter in exemplary embodiments, the present invention is not limited to this configuration, and aspects of the present invention are characterized by the resetting mechanisms connected to the block lines. Other modifications may be made within the scope of the invention. The resetting units are provided for at least a number of the block lines. Most preferably, the resetting units are provided for all of the block lines. However, the resetting units may not be provided for, among the block lines, block lines in the vicinity of a resetting unit of the common signal line but may be provided for block lines remote from the resetting unit of the common signal line.

Note that the vertical signal lines correspond to lines extending in a first direction. Furthermore, a horizontal signal line corresponds to a line extending in a second direction. The first direction and the second direction are not necessarily orthogonal. In the exemplary embodiments, the horizontal signal line corresponds to a common signal line.

First Exemplary Embodiment

Referring to FIG. 1, a configuration of a first exemplary embodiment will be described in detail. In FIG. 1, a path from a pixel unit 101 through a read unit 102 (for example, the first read unit 102a shown in FIG. 6) to an output terminal 107 (for example, the first output terminal 107a shown in FIG. 6) is shown.

In the pixel unit 101, pixels 126 are arranged in a matrix. Each of the pixels 126 includes a photodiode PD, which is a photoelectric conversion element, a transfer switch TX used to transfer a charge of the photodiode PD, and a resetting switch RES used to reset an active region to which the charge is transferred. Each of the pixels 126 further includes a MOSFET (SF) used to output a potential obtained in accordance with the charge, and a switch SEL used to select a corresponding pixel. Note that this configuration is merely an example. The pixels 126 are connected to corresponding vertical signal lines 127 arranged in a columnar direction. Amplifier units 125 used to amplify signals output from the pixels 126 and a switch unit 128 used to transmit the signals are connected to the corresponding vertical signal lines 127.

The read unit 102 includes a line memory unit 108, which stores the signals transmitted through the switch unit 128. A switch unit 109 is used to output the signals stored in the line memory unit 108 to block lines 112 and 113. Switches 120 and 121 are used to output the signals supplied from the block lines 112 and 113 to a common signal line 111. Furthermore, the block lines 112 and 113 include respective resetting units 122. Each of the resetting units 122 supplies a desired voltage (resetting voltage) VCHR to a corresponding one of the block lines 112 and 113, and is constituted by a MOSFET in this exemplary embodiment.

Because the block lines 112 and 113 are arranged in the read unit 102, the number of switches directly connected to the common signal line 111 is reduced and a parasitic capacitance of the common signal line 111 is reduced. In addition, because the block lines 112 and 113 are connected to the respective resetting units 122, resetting operations of the common signal line 111 and the block lines 112 and 113 are performed at high speed. In addition, a signal reading operation is performed at high speed. With the resetting operations being readily performed, variations in the resetting potentials of the block lines 112 and 113 may be reduced and, therefore, a high-quality image signal may be obtained.

Second Exemplary Embodiment

A photoelectric conversion apparatus according to a second exemplary embodiment is different from that according to the first exemplary embodiment in that four pairs of block lines and two pairs of common signal lines are arranged. With this configuration, signals having reduced noise components may be obtained and, therefore, a high-quality image may be obtained. Furthermore, because a pair of common signal lines 118 and a pair of common signal lines 119 are provided, the number of block lines and the number of switches connected to each of the pairs of common signal lines are reduced, resulting in reduced capacitances of the common signal lines. Similarly, because pairs of block lines 114 to 117 are provided, capacitances of the block lines are reduced. Accordingly, a reading operation faster than that of the first exemplary embodiment may be performed.

Figure 2:
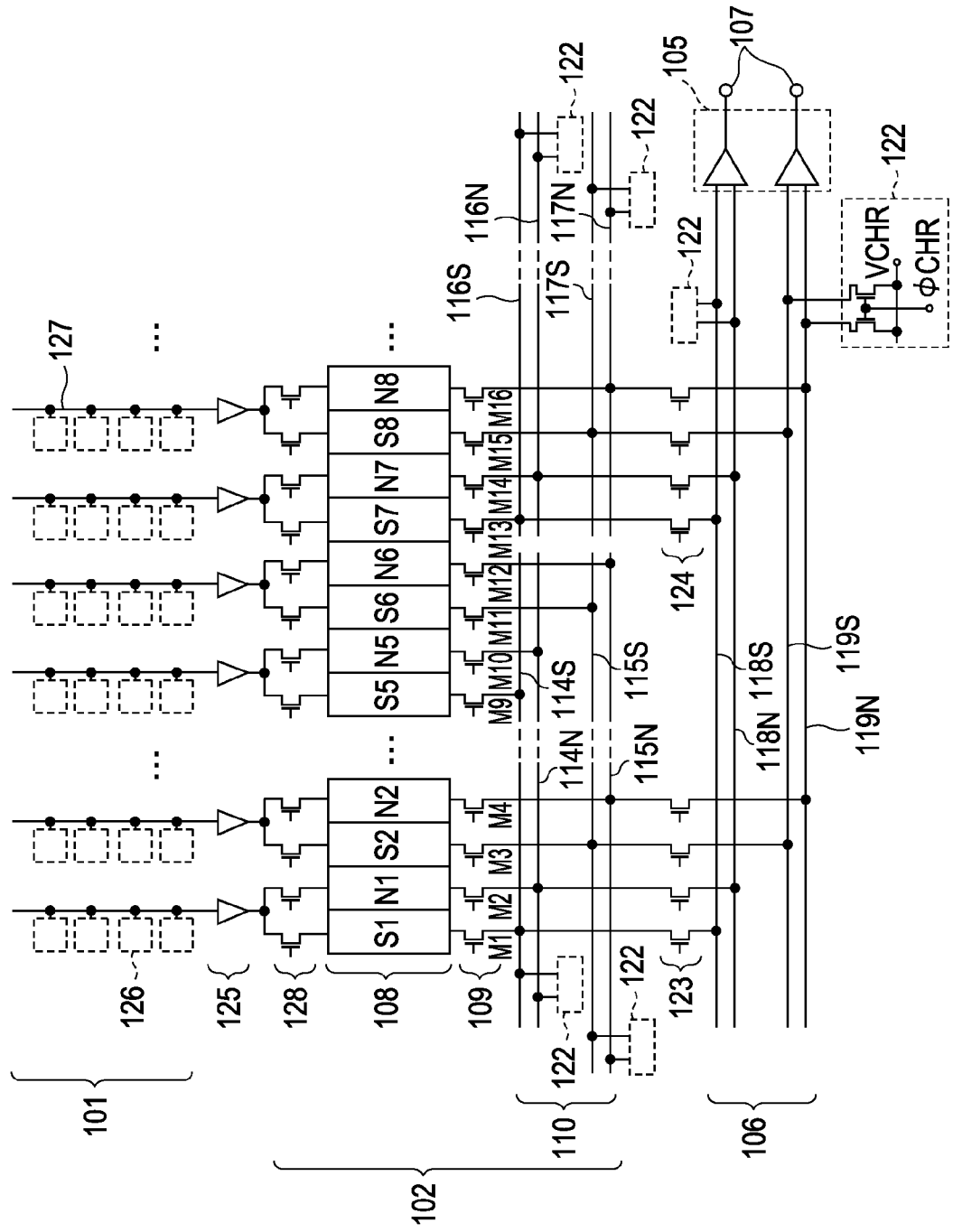
FIG. 2 is a circuit diagram schematically illustrating a read unit according to a second exemplary embodiment.

Referring to FIG. 2, the configuration of the second exemplary embodiment will be described in detail. A block line unit includes four pairs of block lines, that is, a pair of block lines 114S and 114N (hereinafter collectively referred to as a block line 114 as needed), a pair of block lines 115S and 115N (hereinafter collectively referred to as a block line 115 as needed), a pair of block lines 116S and 116N (hereinafter collectively referred to as a block line 116 as needed), and a pair of block lines 117S and 117N (hereinafter collectively referred to as a block line 117 as needed). A common signal line unit includes a pair of common signal lines 118S and 118N (hereinafter collectively referred to as a common signal line 118 as needed) and a pair of common signal lines 119S and 119N (hereinafter collectively referred to as a common signal line 119 as needed). A line memory S1 stores light signals transmitted from corresponding pixels, and a line memory N1 stores noise signals in which the light signals are superimposed thereon. The noise signals are removed from the light signals by obtaining a difference between the noise signals and the light signals. Other pairs of line memories such as a pair of a line memory N2 and a line memory S2 are shown in FIG. 2 and correspond to lines of columns of pixels. In the block line unit and the common signal line unit, the reference character "S" denotes a path for light signals and the reference character "N" denotes a path for noise signals. Signals supplied to the block lines 114 and 115 are supplied through a switch unit 123 to the common signal line 118 or the common signal line 119 whereas signals supplied to the block lines 116 and 117 are supplied through a switch unit 124 to the common signal line 118 or the common signal line 119. The block lines 114 115, 116, and 117 have resetting units 122. With this configuration, an amount of time required for resetting operations of the block lines is reduced, a variation of the signals is reduced, and a signal reading operation is performed at higher speed.

Figure 4:
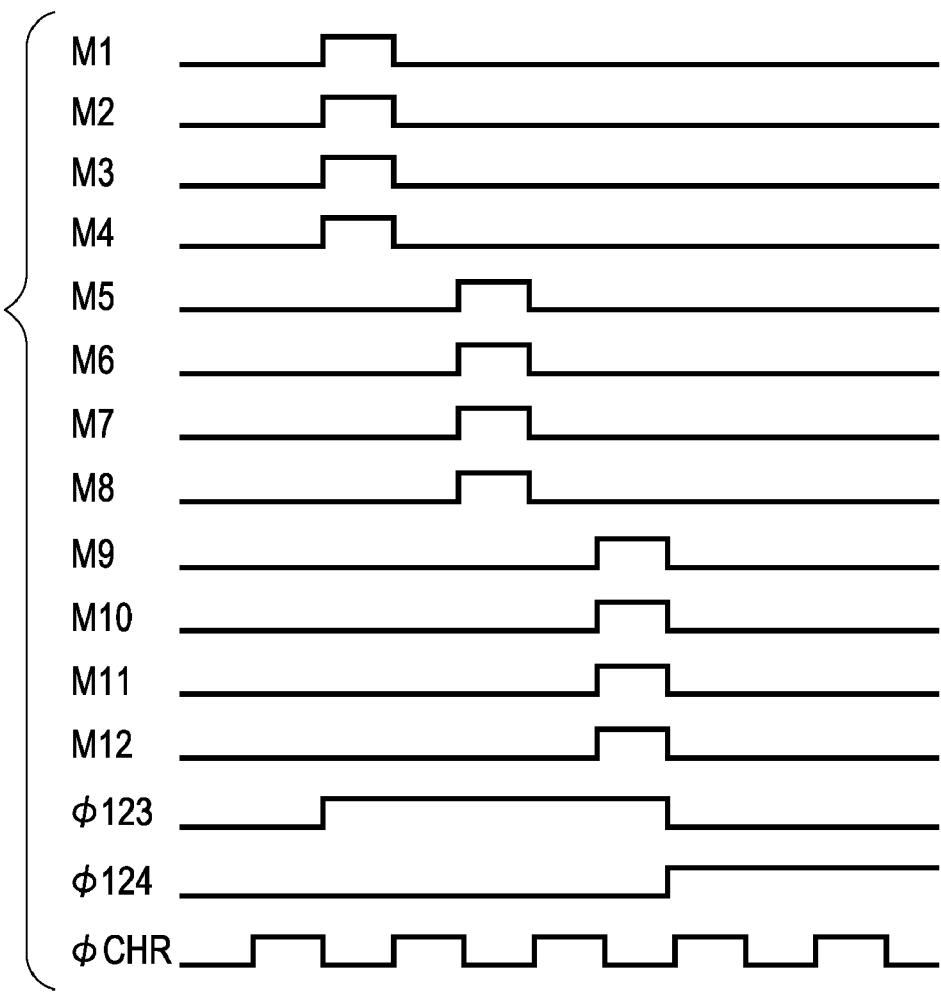
FIG. 4 is an example of a driving method according to the second exemplary embodiment.

Referring to FIG. 4, an example of a driving method according to this exemplary embodiment will be described. In FIG. 4, pulses M1 to M12 control switches M1 to M12 included in a transfer switch unit 109. Pulses φ123 and φ124 control the switches 123 and 124. A pulse φCHR controls MOS transistors of the resetting units. Here, the MOS transistors are turned on using high-level pulses.

First, signals supplied from a pixel unit are stored in the line memory unit 108. Thereafter, the switches M1 to M4 included in the switch unit 109 are turned on, high-level pulses are input to the MOS transistors of the resetting units 122, and resetting operations are performed. Here, the high-level pulses are supplied to all of the resetting units 122 and the resetting operations are simultaneously performed. The signals supplied from the pixel unit to the switches M1 and M2 are further supplied to the common signal line 118, and the signals supplied from the pixel unit to the switches M3 and M4 are further supplied to the common signal line 119. This process is repeatedly performed to output the signals.

In this exemplary embodiment, examples of the noise signals superimposed on the light signals include noise signals of pixels, and noise signals (offset signals) of amplifiers in a case where the amplifiers are arranged on signal paths between the block lines and the pixels.

Figure 5:
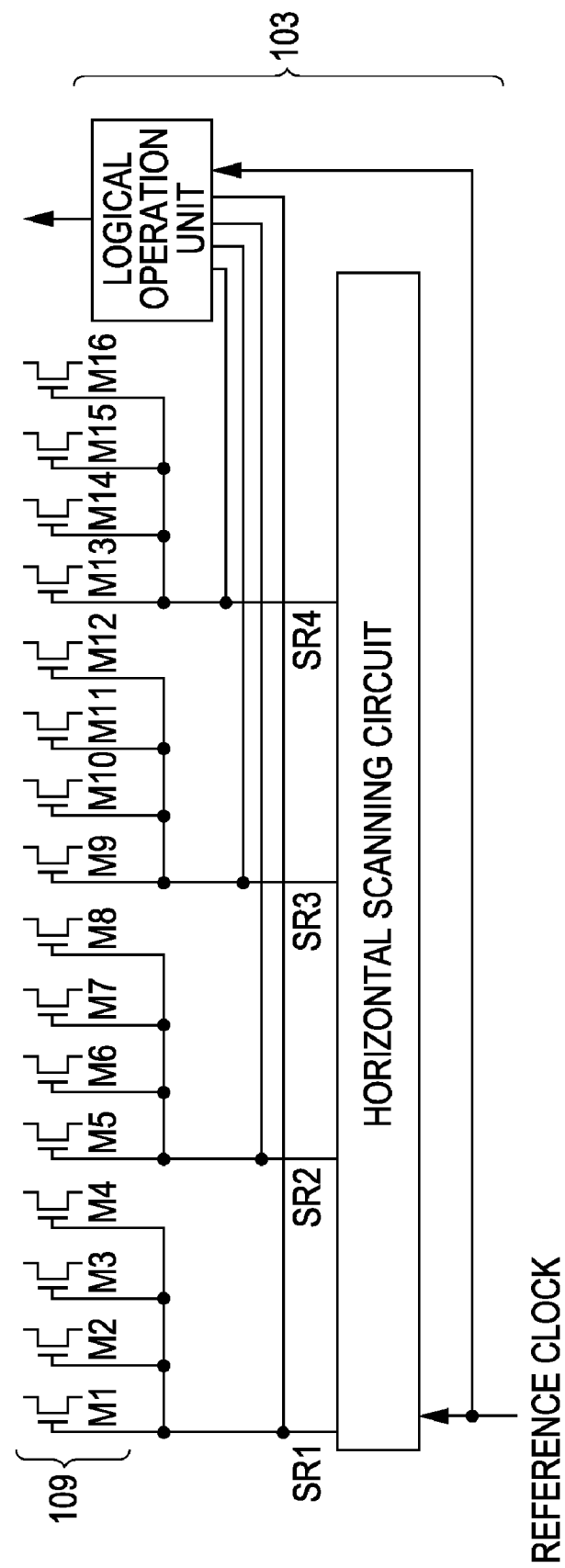
FIG. 5 is an example of a driving circuit according to the second exemplary embodiment.

FIG. 5 is a schematic diagram illustrating a driving circuit unit 103 according to this exemplary embodiment. The driving circuit unit 103 includes a data transfer unit constituting a horizontal scanning unit, and a logic circuit constituting a logical operation unit. The driving method, that is, a method for performing the signal reading operation, may be changed by changing a configuration of the logical operation unit.

In the configuration shown in FIG. 5, a reference clock is input to the horizontal scanning circuit. Then, the switches M1 to M4 included in the switch unit 109 are turned on in response to signals output from an output terminal SR1 of the horizontal scanning circuit. Then, the switches M5 to M16 included in the switch unit 109 are successively turned on in response to signals output from output terminals SR2 to SR4. The signals output from the output terminals SR1 to SR4 are also supplied to the logical operation unit, and the pulses φ123 and φ124 are supplied to the switch units 123 and 124. Note that the pulses φ123 and φ124 may be simply supplied using lines. However, because the signals output from the output terminals SR1 to SR4 are used in this exemplary embodiment, the times required for performing the resetting operations are reduced.

In this exemplary embodiment, although the driving method is employed in the configuration according to the first exemplary embodiment, the driving method may be made applicable to other configurations by changing a driving method of a frequency divider circuit and the number of control lines.

With the configuration of the second exemplary embodiment, a photoelectric conversion apparatus capable of performing resetting operations readily and performing a signal reading operation at high speed while capacitances of the common signal lines are reduced by using the block lines is obtained. Furthermore, because the resetting operations are readily performed, a variation in the resetting potentials of the block lines is reduced and, therefore, a high-quality image signal is obtained.

Third Exemplary Embodiment

Figure 3:
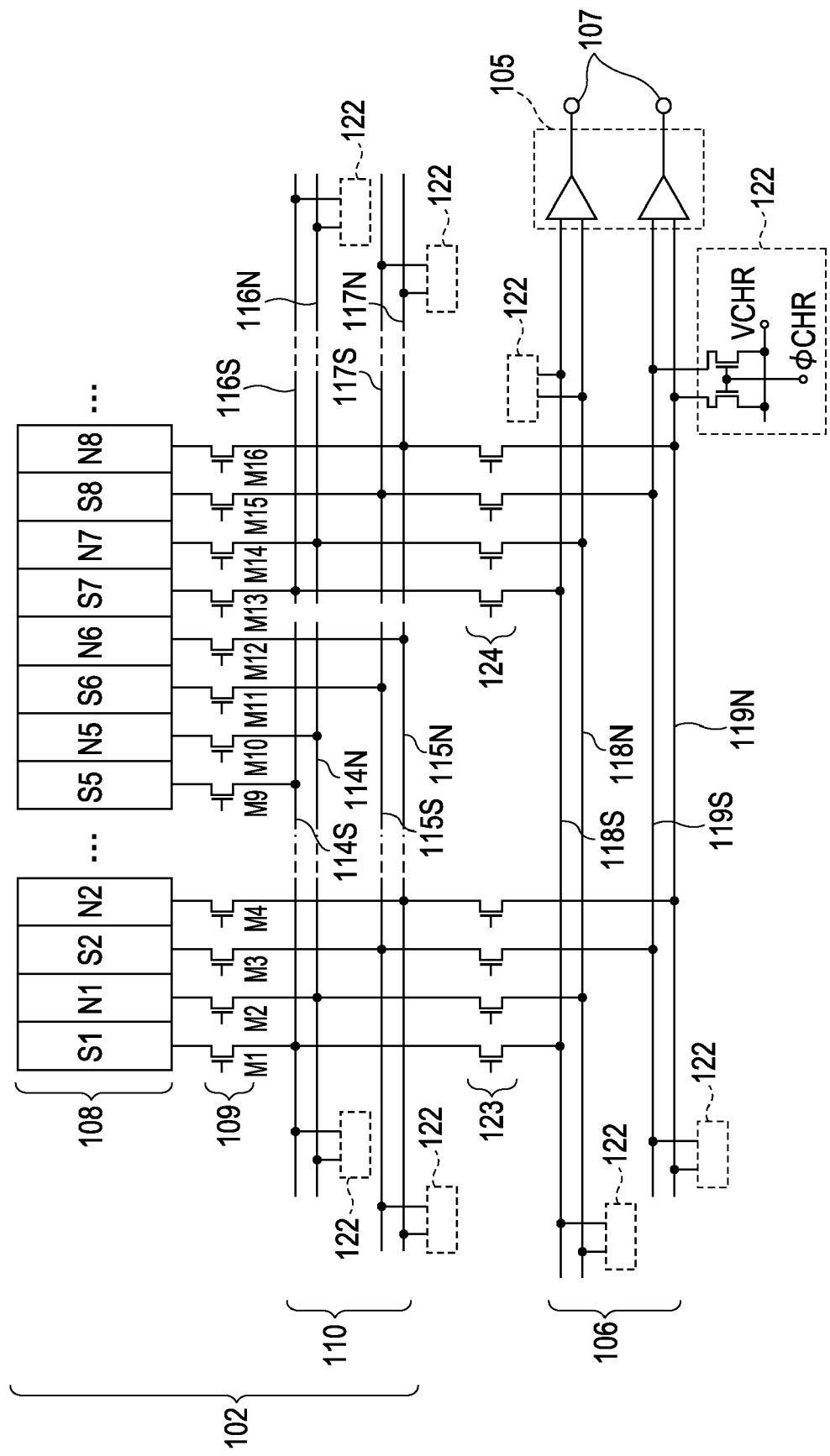
FIG. 3 is a circuit diagram schematically illustrating a read unit according to a third exemplary embodiment.

In a third exemplary embodiment, as shown in FIG. 3, the number of resetting units connected to common signal lines of the third exemplary embodiment is larger than the number of resetting units connected to the common signal line of the second exemplary embodiment. In FIG. 1, the single resetting unit is connected to the common signal line. However, in FIG. 3, resetting units are connected to each of the common signal lines at a first end thereof in the vicinity of an amplifier circuit 105 and at a second end thereof opposite to the first end. With this configuration, when compared with the second exemplary embodiment, resetting operations are more readily performed and a signal reading operation is performed at higher speeds. Particularly, because a plurality of resetting units are separately provided for each common signal line, high-speed resetting operations are performed.

Fourth Exemplary Embodiment

Figure 7:
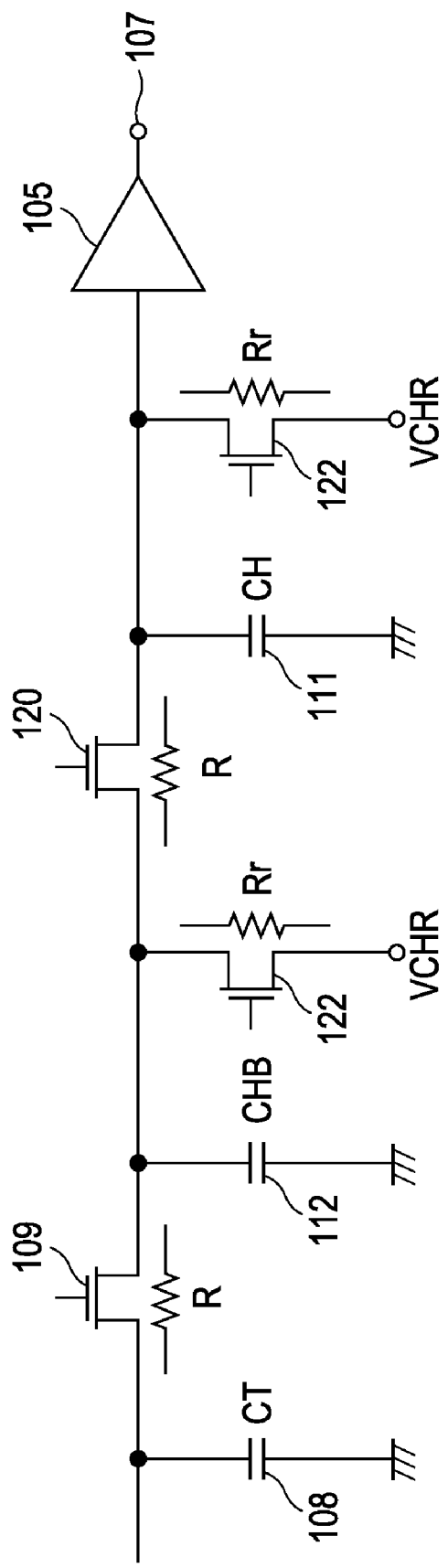
FIG. 7 is a schematic diagram illustrating the first exemplary embodiment.

In a fourth exemplary embodiment, when compared with the exemplary embodiments described above, driving forces of switches used for resetting units are more strictly defined. Taking the first exemplary embodiment as an example, the driving forces of the switches will be described. FIG. 7 is a schematic diagram illustrating a portion including the read unit 102 and the output terminals 107. The block line 112 and the common signal line 111 are denoted by capacitances CHB and CH, respectively. The switches are denoted by on-resistances R and Rr. It is assumed that CT=CHB=CH is satisfied for simplicity, a harmonic average of time constants obtained when the signals are read from the line memory unit 108 to the common signal line 111 is as follows: $(CT//(CHB+CH)) \times R = (2/3)CT \times R$. An amount of time required for the resetting operation is obtained as follows: $CHB \times Rr = CH \times Rr = CT \times Rr$. When the amount of time required for performing the signal reading operation is substantially equal to the amount of time required for performing the resetting operation, the resistance Rr needed to achieve a high-speed signal reading operation is obtained as follows: $Rr=(2/3)R$. Accordingly, the switches of the resetting units should have on-resistances smaller than the on-resistances of the switches used to transmit the signals. This fact is applicable not only to the first exemplary embodiment but also to the other exemplary embodiments.

Fifth Exemplary Embodiment

In a fifth exemplary embodiment, an example of a configuration of a portion including the pixels and the block lines will be described. The configuration of each of the pixels is as described above. Signals (noise signals) obtained on the basis of potentials of an active region to which the charge is transferred, which are set to be a reference potential using the resetting transistors (that is, at the time of the resetting operations), are output from the pixels 126 to the vertical signal lines 127. Furthermore, signals that are used to form an image and are obtained on the basis of charges transferred from the photoelectric conversion elements (that is, the light signals in which the noise signals are superimposed thereon) are output from the pixels 126 to the vertical signal lines 127. A constant current source (not shown), which is a part of a source follower circuit, is connected to the vertical signal lines 127. Thereafter, the noise signals and the signals obtained on the basis of the charges are subjected to differential processing using clamp capacitors arranged on an upstream stage of the amplifier units 125, whereby signals in which noises are suppressed are obtained. Then, the signals in which noises of the pixels are suppressed are amplified using the amplifier units 125 connected to the vertical signal lines 127 and are supplied through the MOSFETs 128 to the line memory unit 108 to be stored. Each of the pairs of two line memories is provided for a corresponding one of the amplifier units 125 so that the differential processing is performed to suppress an offset of the corresponding one of the amplifier units 125.

The signals stored in the line memory unit 108 are supplied through the switch unit 109 to the block lines.

According to the fifth exemplary embodiment, signals are amplified before being supplied to the block lines and the common signal lines. Accordingly, an SN ratio is improved when compared with the exemplary embodiments described above.

Sixth Exemplary Embodiment

In a sixth exemplary embodiment, an example in which a signal detection apparatus of the present invention is applied to an image pickup system will be described. A case where the signal detection apparatus serving as a photoelectric conversion apparatus having a photoelectric conversion elements used to detect light is employed in a digital still camera serving as the image pickup system will be described with reference to FIG. 8. An example of the image pickup system includes a digital camcoder.

Figure 8:
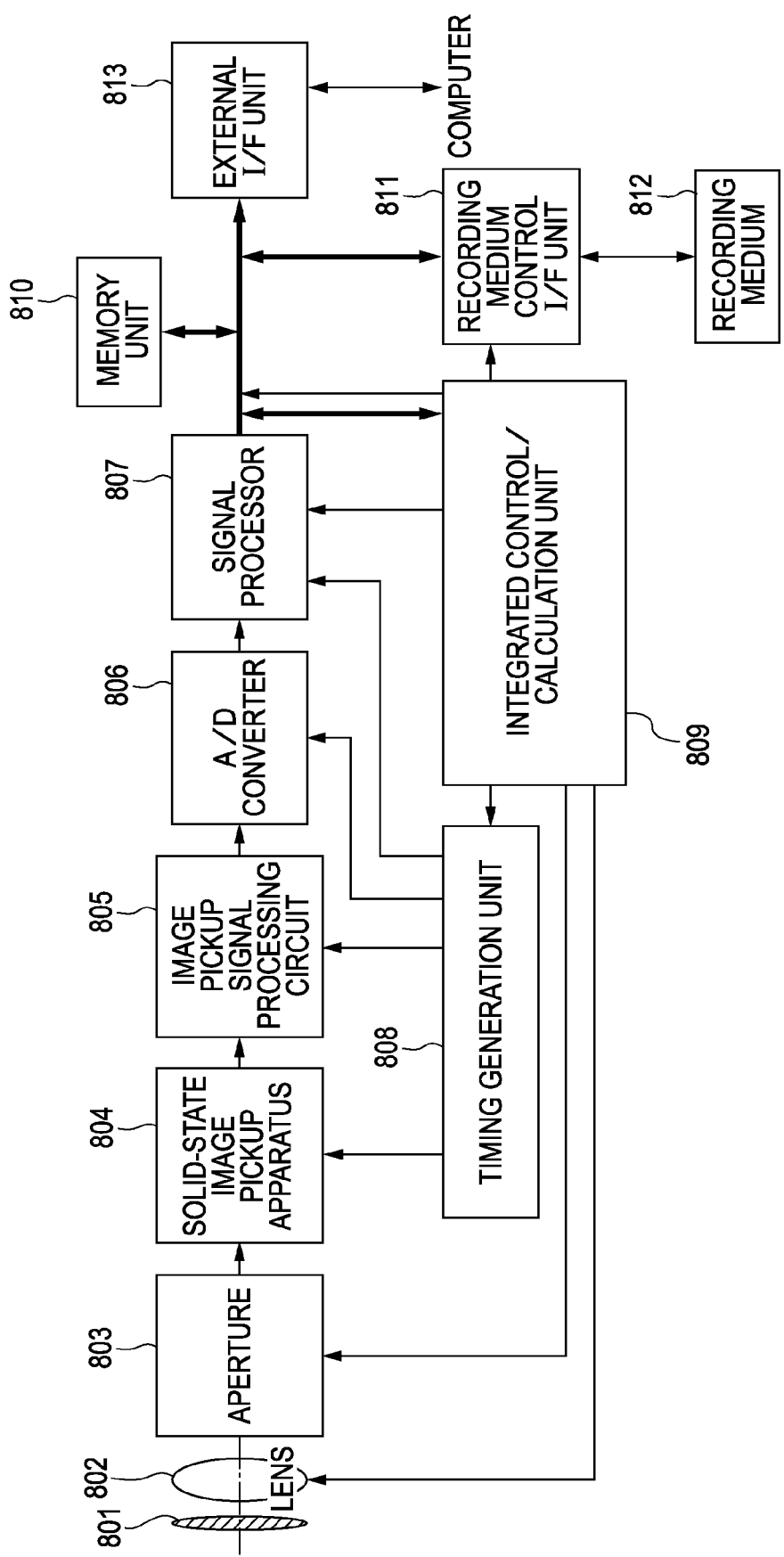
FIG. 8 is a block diagram illustrating an image pickup system according to the second exemplary embodiment.

FIG. 8 is a block diagram illustrating a system of a digital still camera including a solid-state image pickup apparatus 804 serving as a photoelectric conversion apparatus having one of the configurations of the exemplary embodiments of the present invention described above.

An optical image of a subject is formed on an imaging plane of the solid-state image pickup apparatus 804 using an optical system that includes a lens 802. A barrier 801, which has a function of protecting the lens 802 and which functions as a main switch, may be arranged outside the lens 802. The lens 802 may include an aperture 803 used to control an amount of exposure. Image pickup signals output in a plurality of channels from the solid-state image pickup apparatus 804 are subjected to various correction operations and a clamping operation using an image pickup signal processing circuit 805. The image pickup signals output in a plurality of channels from the image pickup signal processing circuit 805 are subjected to analog/digital conversion using an A/D converter 806 to obtain image data. The image data output from the A/D converter 806 is subjected to various correction operations and a compression operation using a signal processor (image processing unit) 807. The solid-state image pickup apparatus 804, the image pickup signal processing circuit 805, the A/D converter 806, and the signal processor 807 operate in accordance with a timing signal generated using a timing generation unit 808.

The image pickup signal processing circuit 805, the A/D converter 806, the signal processor 807, and the timing generation unit 808 may be arranged with the solid-state image pickup apparatus 804 on an identical chip, and are controlled using an integrated control/calculation unit 809. The digital still camera further includes a memory unit 810 used to temporarily store the image data and a recording medium control interface unit 811 used to write and read the image data representing an image. A recording medium 812 used with the memory unit 810 is a removable medium and includes a semiconductor memory. Furthermore, the digital still camera may include an external interface unit 813 used to communicate with an external computer, for example.

Referring to FIG. 8, an operation of the digital still camera will now be described. When the barrier 801 is opened, a main power source, a power source for a control system, and a power source for an image pickup system circuit, such as the A/D converter 806, are successively turned on. Thereafter, the integrated control/calculation unit 809 controls the opening of the aperture 803 so that an amount of exposure is controlled. Signals output from the solid-state image pickup apparatus 804 are supplied through the image pickup signal processing circuit 805 to the A/D converter 806. The A/D converter 806 performs an A/D conversion on the signals to obtain data and the data is output to the signal processor 807. The signal processor 807 processes the data and supplies the data to the integrated control/calculation unit 809. Upon reception of the data, the integrated control/calculation unit 809 performs a calculation operation so that the amount of exposure is determined. The integrated control/calculation unit 809 controls the aperture 803 on the basis of the determined amount of exposure.

Then, the integrated control/calculation unit 809 obtains a high-frequency component from the data, which is obtained by conversion from the signals output from the solid-state image pickup apparatus 804 and which has been processed using the signal processor 807, and a distance between the digital still camera and the subject is calculated on the basis of the high-frequency component. Thereafter, the lens 802 is driven and a determination is made as to whether the subject is focused. When the determination is negative, the lens 802 is driven again and the distance is calculated again.

When the determination is affirmative, a main exposure operation is performed. When the exposure operation is terminated, the image pickup signals output from the solid-state image pickup apparatus 804 are subjected to various correction operations using the image pickup signal processing circuit 805, are subjected to the A/D conversion using the A/D converter 806, and are processed using the signal processor 807. The integrated control/calculation unit 809 controls the memory unit 810 to store the image data processed using the signal processor 807.

Thereafter, the image data stored in the memory unit 810 is supplied through the recording medium control interface unit 811 to the recording medium 812 to be stored under control of the integrated control/calculation unit 809. The image data may be supplied through the external interface unit 813 to a computer, for example, to be processed.

Because a photoelectric conversion apparatus capable of performing a high-speed signal reading operation is used, an image pickup system that is capable of providing a high-quality image, even when high-speed shooting or shooting of a moving picture is performed, is enabled.

Note that although a photoelectric conversion apparatus is described in the above exemplary embodiments, the present invention also relates to a configuration of a common signal line, and detected signals may be magnetic signals.

While the present invention has been described with reference to exemplary embodiments, it is to be understood that the invention is not limited to the disclosed exemplary embodiments. The scope of the following claims is to be accorded the broadest interpretation so as to encompass all modification and equivalent structures and functions.

This application claims the benefit of Japanese Application No. 2007-053051 filed Mar. 2, 2007, which is hereby incorporated by reference herein in its entirety.

What is claimed is:

1. A photoelectric conversion apparatus, comprising:
   photoelectric conversion elements arranged in two dimensions;
   a plurality of vertical signal lines to which signals from the photoelectric conversion elements are output;
   signal holding units that hold the signals outputted to the vertical signal lines;
   a horizontal signal line to which the signals from the signal holding units are outputted;
   a plurality of block lines, wherein some of the signal holding units constitute one block, a plurality of blocks are provided, and the signals from the signal holding units included in same blocks are read to corresponding block lines of the plurality of block lines; and
   a plurality of switches for transferring signals read to the plurality of block lines to the horizontal signal line,
   wherein resetting means for resetting potentials of the block lines are provided in the plurality of block lines.

2. The photoelectric conversion apparatus according to claim 1, wherein the resetting means are provided in all the block lines.

3. The photoelectric conversion apparatus according to claim 1,
   wherein the block lines include first block lines and second block lines,
   wherein the horizontal signal line includes a first horizontal signal line and a second horizontal signal line,
   wherein signals from the first block lines are transferred to the first horizontal signal line, and
   wherein signals from the second block lines are transferred to the second horizontal signal line.

4. The photoelectric conversion apparatus according to claim 1, wherein resetting means for setting the horizontal signal line to a reset potential is provided in the horizontal signal line.

5. The photoelectric conversion apparatus according to claim 1, wherein the resetting means include MOS transistors.

6. The photoelectric conversion apparatus according to claim 5, wherein the MOS transistors of the resetting means have on-resistances smaller than on-resistances of the plurality of switches.

7. The photoelectric conversion apparatus according to claim 1, wherein
   the photoelectric conversion apparatus is incorporated in an image pickup system, and
   the image pickup system includes an image processing unit that processes an image signal outputted from the photoelectric conversion apparatus.

8. The photoelectric conversion apparatus according to claim 1,
   wherein the block lines include first block lines to which a signal based on an electrical charge generated at a photoelectric conversion element is outputted and second block lines to which a signal superimposed on the signal based on an electrical charge generated at the photoelectric conversion element is outputted, wherein the horizontal signal line includes a first horizontal signal line and a second horizontal signal line,
wherein signals from the first block lines are transferred to the first horizontal signal line, and
wherein signals from the second block lines are transferred to the second horizontal signal line.

* * * * *